United States Patent [19]

Noorlander

[11] Patent Number: 4,648,350
[45] Date of Patent: Mar. 10, 1987

[54] TEAT CUP ASSEMBLY WITH AUTOMATIC CUT OFF VALVE

[76] Inventor: Daniel O. Noorlander, 508 W. 630 South, Orem, Utah 84057

[21] Appl. No.: 738,879

[22] Filed: May 29, 1985

Related U.S. Application Data

[63] Continuation-in-part of Ser. No. 631,213, Jul. 16, 1984, Pat. No. 4,582,022.

[51] Int. Cl.[4] ............................................... A01J 5/08
[52] U.S. Cl. ............................... 119/14.32; 119/14.47
[58] Field of Search .......................... 119/14.32–14.38, 119/14.47

[56] References Cited

U.S. PATENT DOCUMENTS 1,159,103 11/1915 Sabroe .............................. 119/14.38
4,452,177 6/1984 Plett ................................. 119/14.32
4,481,906 11/1984 Steingraber et al. ............. 119/14.32

Primary Examiner—Hugh R. Chamblee
Attorney, Agent, or Firm—Thorpe, North and Western

[57] ABSTRACT

A valve assembly for mounting in the outlet of a teat cup assembly. The valve assembly comprises a valve housing connected to the outlet of a teat cup assembly. The housing includes a nipple formed in the bottom portion thereof for connection to a milk suction line. A valve member is mounted inside the valve housing and adapted to seat on a valve seat in the housing when the interior of the housing is exposed to atmospheric pressure. The valve assembly further includes a plunger means slidably mounted in an opening in the wall of the valve housing, and the plunger means is adapted to slide inwardly into the valve housing when the pressure in the housing falls below atmospheric pressure. The inward movement of the plunger means is adapted to dislodge the valve member from its seated position in the valve housing.

3 Claims, 4 Drawing Figures

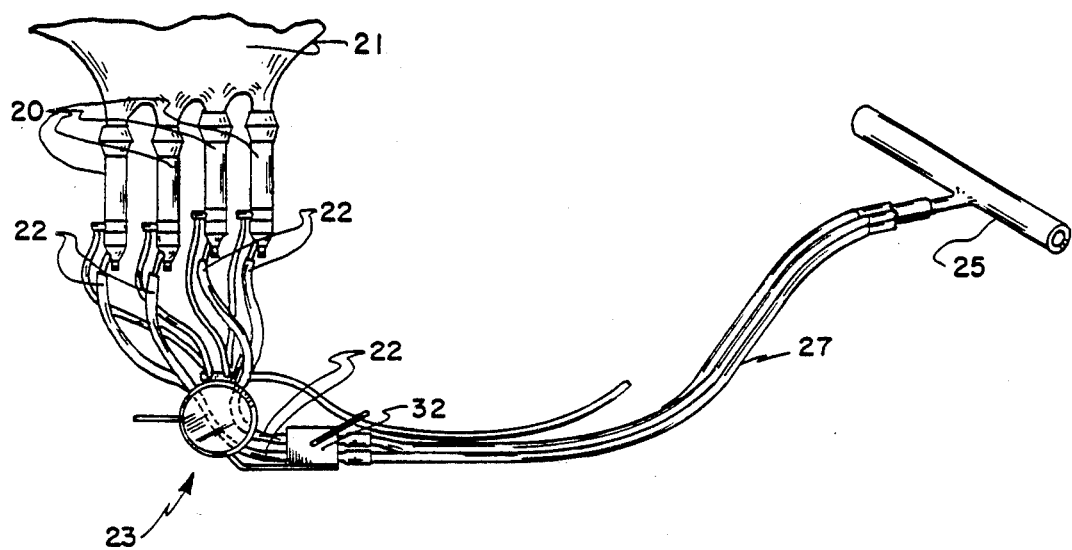
FIG. 1
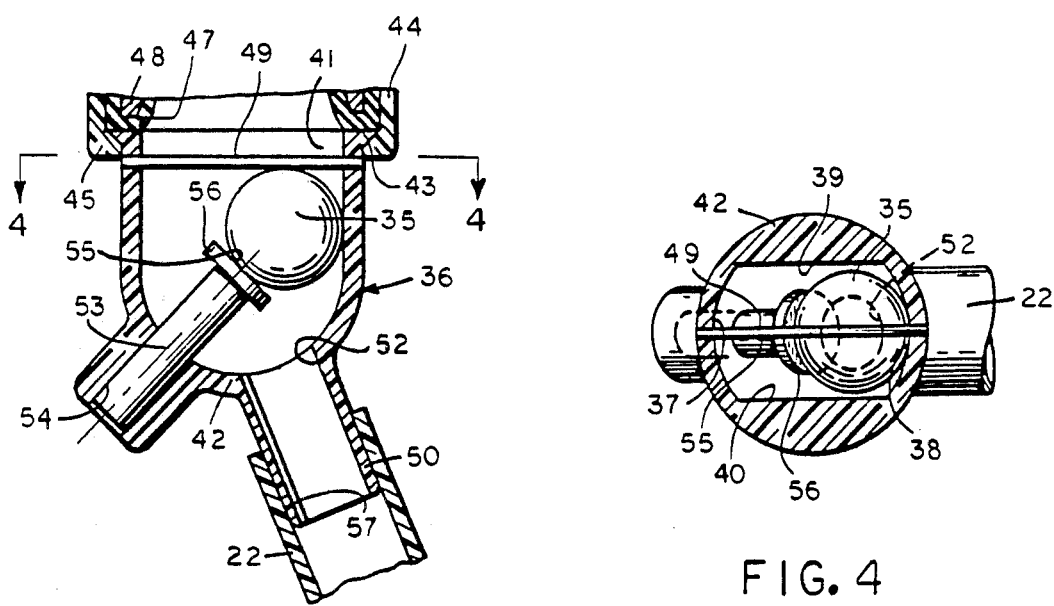
FIG. 3
FIG. 4

TEAT CUP ASSEMBLY WITH AUTOMATIC CUT OFF VALVE

BACKGROUND OF THE INVENTION

Related Application

This application is a continuation-in-part of application Ser. No. 631,213 filed 7-16-84, now U.S. Pat. No. 4,582,022. The entire contents of application Ser. No. 631,213 are incorporated herein by reference.

Field

The invention relates in general to teat cup assemblies and automatic valve incorporated with the teat cup assemblies for turning off the suction to the teat cup assemblies. A teat cup employing a built in valving means is provided for closing individual hose lines when a teat cup and its respective hose line fall from a teat of the animal being milked.

State of the Art

The construction and design of automatic milking apparatus has been recognized as a very important consideration in the dairy industry. Bacterial contamination of the milking machines and milk contributes directly to economic loss in the dairy industry, and much effort has been made in hygienic precautionary measures as well as in the design and construction of the miling apparatus.

A problem exists when a teat cup assemly falls from the teat of the animal being milked. Dirt and debris may be sucked into the fallen teat cup assembly and become contained in the milk. Conventional claws used in milking machines commonly contain ferrules which are supposed to kink the vacuum hose line when the teat cup assembly falls from the teat. These ferrules are often times unsuccessful in closing the vacuum hose, and dirt and debris is often times sucked into the milking machines. The ferrules are destructive of the vacuum hoses, especially when the hoses are made of silicone rubber.

The use of various valves have been suggested between the suction line and the respective teat cup assembly. These valves provide means for opening and closing the suction line, but the valves are not well adapted to automatically close the vacuum line when one of the teat cup assemblies unexpectedly falls from the teat of the animal being milked. Examples of such valves are shown in the following U.S. Pat. Nos. 938,857; 1,641,316; 1,705,293; 2,986,117; 3,163,394; 3,520,330; and 3,550,612.

Objectives

A principal objective of the present invention is to provide a practical milking system which reduces the cyclic vacuum variations at the ends of the teats of the animal being milked and which otherwise occur due to opening and closing of the inflations of the other milking cups and by one or more milking cups falling from the teat of the animal.

A particular objective of the invention is to provide a valve means which will prohibit large amounts of air or other matter from entering a milking system and deteriorating the vacuum or suction stability of the system when the teat cup assembly is not on the teat of the animal being milked.

A further objective of the invention is to provide a valve means which will inhibit the transfer of disease such as mastitis from one cow to another as a result of backflow of milk from one teat cup assembly to another.

A further objective of the invention is to provide a novel teat cup which has built thereinto a unique valving means adapted to close the vacuum hose line attached to the teat cup whenever the teat cup falls from a teat of the animal being milked.

SUMMARY OF THE INVENTION

The above objectives are achieved in accordance with the present invention by a novel teat cup assembly and in particular a novel valve means for mounting in the outlet of a teat cup assembly. The valve means is contained within a valve housing which also forms the outlet of the teat cup assembly. The housing includes a nipple formed in the bottom portion thereof for connection to a milk suction line. A valve member is mounted inside the housing and adapted to seat on a valve seat within the housing to effectively close the nipple when the interior of the housing is exposed to atmospheric pressure, i.e., when the teat cup assembly is not engaged on a teat of an animal which is to be milked.

The valve means further includes a plunger means slidably mounted in the wall of the housing, with the plunger means being adapted to slide inwardly into the valve housing when the pressure in the housing falls below atmospheric pressure. The inward movement of the plunger means is adapted to dislodge the valve member from the valve seat within the housing and thus open the nipple to the valve housing and the teat cup assembly. When the side of the housing is exposed to atmospheric pressure, such as when the teat cup assembly becomes disengaged from the teat of the animal being milked, the plunger means moves outwardly from the housing, thus allowing the valve member to seat on the valve seat within the housing.

Additional objects and features of the invention will become apparent from the following detailed description, taken together with the accompanying drawings.

THE DRAWINGS

Particular embodiments of the present invention representing the best mode presently contemplated of carrying out the invention are illustrated in the accompanying drawings in which:

FIG. 1 is a pictorial representation of milking machine apparatus in accordance with the present invention as it is attached to the udder of a cow;

FIG. 3 is a sectional view of a second embodiment of valve means in accordance with the present inventions; and FIG. 4 is a sectional view of the valve means of FIG. 3 taken along the line 4—4 of FIG. 3.

DETAILED DESCRIPTION OF THE ILLUSTRATED EMBODIMENTS

Figure 2:
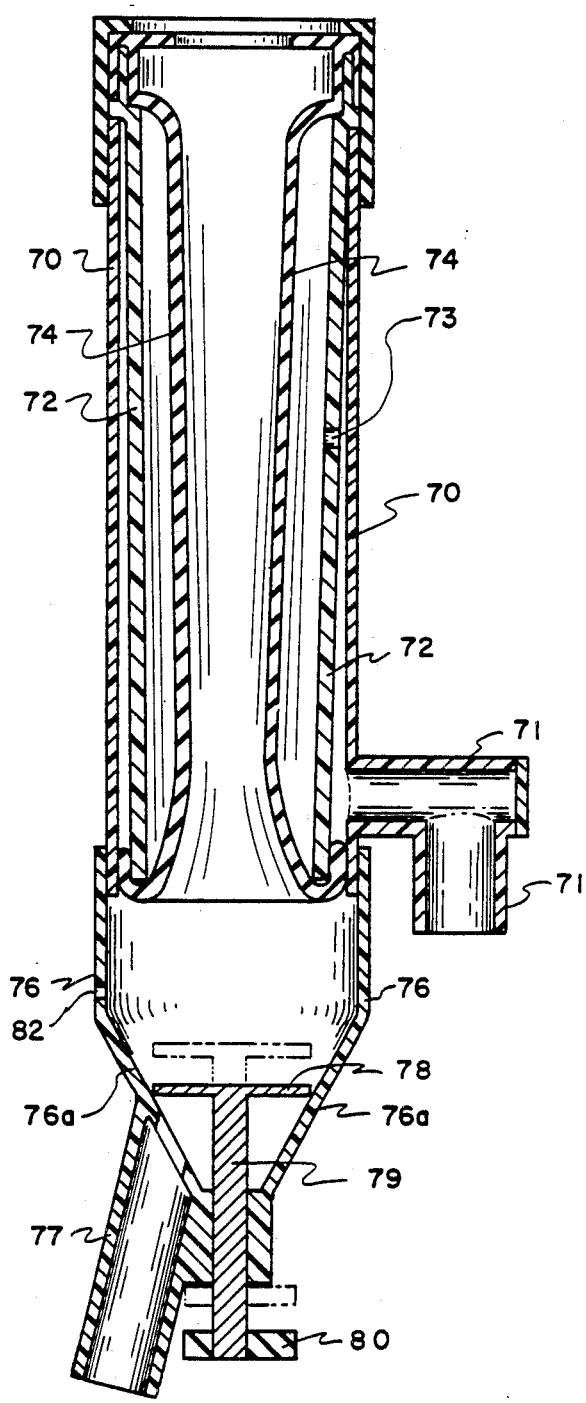
FIG. 2 is a vertical cross-section of a teat cup assembly which has incorporated therein a built in valve means which is adapted to close the vacuum hose line the teat cup assembly whenever the teat cup assembly falls from a teat of an animal which is being milked.

Preferred embodiments of the invention are shown in the drawings. A general milking system which incorporates the invention is shown in FIG. 1. The novel teat cup assemblies 20 will be described more fully hereinafter. In FIG. 1, the teat cup assemblies 20 are shown attached to the teats of the udder 21 of a cow. The vacuum hose lines 22 hang downwardly from the teat cups 20 and are collected or brought together in closely spaced arrangement by the novel collector member 23 which is described and claimed in my copending application Ser. No. 631,213. The collector member 23 is of sufficient weight to provide adequate tension in the teats of the cow to facilitate opening of the teat lumen for maximum milk outflow. Generally, a weight of from about 2 to 6 pounds is preferable. The collector member 23 preferably includes a releasable clamp means 32, which, as fully described in my copending application Ser. No. 631,213, is adapted to simultaneously compress the vacuum hose lines when the clamp means is activated and, thus, close off the vacuum in the vacuum hose lines 22 to all the teat cup assemblies 20. The assembled hose lines 22 can be periodically banded together to form a somewhat unitary, multi-line conduit 27 which extends from the collector member to the milk pail or common milk pipe 25 as shown in FIG. 1.

One embodiment of the novel teat cup assembly, including a built in valve means which is automatically activated when the teat cup assembly falls from the teat of an animal, is illustrated in FIG. 2. The teat cup assembly comprises a rigid, tubular, outer shell 70 having a port and nipple 71 therein which is adapted to be connected to a source of pulsating vacuum. A rigid inner shell 72 can be provided, however, as is well known in the art, the teat cup assembly may be of the type which does not utilize the rigid inner shell (see, for example, the teat cup assembly of U.S. Pat. No. 4,315,480 which does not utilize a rigid inner shell).

When an inner shell 72 is used, as illustrated in FIG. 2, the top of the inner shell 72 and the top of the outer shell 70 are sealed together, and an opening 73 is provided in the sidewall of the inner shell 72. An elongate tubular inflation 74 made of a resilient, flexible, elastomeric material is received longitudinally within the rigid, inner shell 72. The upper end of the inflation 74 is sealed to the upper end of the rigid, inner shell 72, and the lower end of the inflation 74 is sealed between the lower end of the rigid, inner shell 72 and the rigid, outer shell 70. A pulsating vacuum chamber, as is well known in the art, is formed between the inflation 74 and the rigid, inner shell 72. The pulsating vacuum is transmitted from the nipple 71 in the outer shell through the opening 73 in the inner shell 72. When an inner shell is not being utilized, the inflation 74, as is well known, is sealed at its opposite ends to the outer shell 70, and the pulsating vacuum chamber is formed between the inflation 74 and the outer shell 70.

A collection chamber and valve housing is formed beneath the lower end of the inflation 74, and the collection chamber is connected by the milk collecting tube 22 to a sourse of constant vacuum. The collecting chamber is formed by a cap member 76 which is attached to the bottom of the outer shell 70. The cap member 76 has a tapered or funnel-shaped section 76a, with a nipple 77 being attached to the lower portion of the funnel-shaped section 76a. The milk collecting tube 22 is connected to the nipple 77.

Novel valving means are associated with the collection chamber of cap member 76, with the valving means being adapted to close the vacuum from the collecting tube 22 from the inflation 74 whenever the teat cup assembly falls from the teat of the animal being milked. The valving mechanism comprises a disc 78 which is adapted to move up and down within the funnel-shaped portion 76a of the cap member 76. When the disc 78 is in its lowermost position, it seats about its perimeter around the inner circumference of the funnel-shaped portion 76a of the cap member 76. The disc 78 is adapted to seat just above the nipple 77, such that when the disc 78 is seated against the inner wall of the funnel-shaped portion 76a of the cap member 76, the vacuum from the hose 22 and nipple 77 is shut off from the remaining part of the teat cup assembly including the inflation 74.

Means are provided for restraining the movement of the disc to an up and down movement along the longitudinal center of the funnel-shaped portion 76a of the cap member 76. As illustrated, a plunger rod 79 is attached to the underside of the disc 78 and extends downwardly from the center of the disc 78. The plunger rod 79 is oriented so as to be substantially perpendicular to the disc 78. The plunger rod 79 passes through an opening in the bottom apex of the funnel-shaped portion 76a. The opening in the apex of the funnel-shaped portion 76a forms a journal-like bearing in which the plunger rod 79 is adapted to move back and forth in a longitudinal direction along the central axis of the cap member 76.

When a teat of an animal which is being milked is engaged in the teat entrance of the inflation 74, i.e., the open upper end of the inflation 74, the constant vacuum applied to the cap member 76 and thus the inflation 74 causes the plunger 79 and disc 78 to automatically move upwardly toward the inflation. Actually, the atmospheric pressure on the exposed lower end of the plunger 79 pushes the plunger 79 and disc 78 upwardly when the vacuum is drawn within the cap member 76 and inflation 74. When, for one reason or another, the teat cup assembly falls from the teat of the animal being milked, the plunger 79 and disc 78 automatically move downwardly until the disc 78 seats against the funnel-shaped sidewall of the cap member 76. The downward movement of the plunger 79 and disc 78 results from the atmospheric pressure in the inflation 74 when the teat of the animal no longer seals the inflation 74. The atmospheric pressure pushes the disc 78 downwardly against the vacuum which is being drawn on the lower side of the disc.

The seating of the disc 78 closes the nipple 77 from the atmosphere and stops the otherwise uninhibited flow of atmospheric air through the inflation 74 into the vacuum system of the milking apparatus. This prevents dirt and debris from being sucked through the inflation 74 and into the milk system. Further, it greatly reduces the volumetric requirements of the vacuum system, such that the vacuum system can adequately maintain vacuum on any teat cup assembly which is still engaged on a teat of the animal being milked. Otherwise, the vacuum system must be greatly oversized volumetrically so that it can handle the uninhibited inflow of atmospheric air while still maintaining necessary vacuum on any teat cup assembly which is still engaged on a teat of the animal being milked.

Means for locking the plunger 79 and disc 78 in the open position is advantageously provided to aid the dairyman in cleaning the teat cup assemblies after use. By locking the disc 78 in the open position, cleaning fluids can be flushed through the teat cup assembly without any difficulty. This assures uniform cleaning of the teat cup assemblY. As shown in FIG. 2, the locking means comprises an off-center disc 80 which is mounted to the protruding lower end of the plunger 79. The disc 80 is eccentrically mounted on the plunger 79, and to lock the disc 78 and plunger 79 in an open position, the plunger is moved upwardly, with the eccentric disc 80 being rotated so that the lobe on the eccentric disc 80 engages the nipple 77. This locks the plunger 79 and disc 78 in the open position. To release the plunger 79 and disc 78 for normal up and down movement, the eccentric disc 80 is rotated so that it no longer contacts the nipple 77.

It is also to be noted that it is advantageous to provide a small air bleed orifice on the teat cup assembly. As shown in FIG. 2, the small air bleed orifice is identified by the numeral 82. The air bleed orifice is located on the sidewall of the cap member 76. The air bleed orifice 82 allows for a constant minimum flow of atmospheric air through the cap member 76, the nipple 77 and the milk tube 22. This air bleed prevents milk from backing up in the milk tube 22 due to variances in the pressures on associated teat cup assemblies.

A second, somewhat modified embodiment of the valve means of the present invention is shown in FIGS. 3 and 4. The modified valve means comprises a ball 35 enclosed in a hollow housing 36 made of plastic. The housing includes sides 37, 38, 39 and 40 which are spaced apart so as to generally restrict lateral movement of the ball 35. The spacing between the sides 39 and 40 is about 1.3 times the diameter of the ball 35 in one lateral direction, and the spacing between the sides 37 and 38 is about 1.9 times the diameter of the ball in another lateral direction. In this embodiment, sides 39 and 40 are flat and sides 37 and 38 are curved.

The hollow housing 36 includes an open upper end 41 and a bottom portion 42. The upper end 41 is formed with an outwardly extending lip 43. Over the end of the housing is placed a threaded sleeve 44 with a bottom inwardly facing lip 45. The lip 45 on the sleeve 44 engages the lip 43 on the housing and secures the valve means to the teat cup assembly 46 when the sleeve 44 is threaded on the teat cup assembly 46. As the valve means is tighted up against the teat cup assembly 46, the upper end 41 of the housing 36 engages and secures the lower end 47 of a teat cup (not shown) against the teat cup assembly shell 48. A pin 49 is attached to the sides of the housing 36 and extends across the open upper end 41. The pin 49 keeps the ball 35 inside the hollow housing 36.

Formed in the bottom portion 42 of the housing is a nipple 50 for establishing connection of the housing interior to suction line 22. Nipple 50 extends at an angle to the vertical axis of the teat cup assembly 46.

The end 51 of the nipple forms an opening 52 in the bottom portion 42 which acts as a seat for the ball 35. When the ball 35 is seated in the opening 52, it provides a partial seal of the opening 52, because of a groove 57 extending the length of the interior surface of the nipple 50.

Mounted adjacent the opening 52 is a plunger 53 slidably mounted in a sleeve or bore 54 in the bottom portion 42. The plunger 53 is inclined upwardly towards the ball 35 when the ball 35 is seated in the opening 52. The end 55 of the plunger 53 inside of the housing 36 includes a rim 56 which is larger than the diameter of the bore 54 in order to retain the plunger 53 in the bore 54. The axes of the plunger 53 and the nipple 50 are in the same vertical plane, as shown in FIG. 3.

The diameter of the plunger 53 is slightly less than the diameter of the bore 54, so that when the end 55 of plunger 53 is away from the bore 54, a small amount of air enters the housing 36 around the plunger 53 and through the bore 54. In a milking operation, the slight air leakage assists the flow of milk through the valve means.

The valve means is molded using conventional means, and can be assembled by placing the plunger 53 in the bore 54, and then placing the ball 35 into the hollow housing 36. The pin 49 is then secured across the open end 41 of the valve housing 36 to retain the ball 35 and the plunger 53 in the housing.

Although preferred embodiments of the invention have been illustated and described, it is to be understood that the present disclosure is made by way of example and that various other embodiments are possible without departing from the subject matter coming within the scope of the following claims, which subject matter is regarded as the invention.

I claim:

1. A valve assembly for mounting in the outlet of a teat cup assembly comprising:
    a valve housing connected to the outlet of a teat cup assembly, said housing having a nipple formed in the wall thereof for connection to a milk suction line;
    a valve member mounted inside said valve housing, said valve member being adapted to seat on a valve seat within said housing when the interior of said housing which communicates with the outlet of the teat cup assembly is exposed to atmospheric pressure; and
    a plunger means slidably mounted in the wall of said valve housing, said plunger means adapted to slide inwardly into said valve housing when the pressure in the interior of said housing which communicates with the outlet of the teat cup assembly falls below atmospheric pressure, said inward movement of said plunger means being adapted to dislodge said valve member from its seated position in the housing.

2. A valve assembly in accordance with claim 1 in which
    the valve housing is formed by a cap member which is attached to the outlet of the teat cup assembly, said cap member having a funnel-shaped section with a nipple attached to and extending from the lower portion of said funnel-shaped section;
    the valve member comprises a disc member which moves up and down within the funnel-shaped portion of said cap member so that when the disc member is in its lowermost position, it seats about its perimeter around the inner circumference of the funnel-shaped portion of said cap member at a position above the nipple which is attached to and extends from said cap member;
    the plunger means comprises a plunger rod which is attached at its upper end to the underside of said disc member so that the plunger rod is oriented substantially perpendicular to said disc member; and
    an opening is provided in the bottom apex of the funnel-shaped portion of said cap member, said opening forming a journal-like bearing through which said plunger rod is adapted to move back and forth in a longitudinal direction along the central axis of said cap member.

3. A valve assembly in accordance with claim 2 wherein means are further provided for locking the plunger rod in a position such that said disc member is restrained in its uppermost position.

* * * * *